No. 638,932. Patented Dec. 12, 1899.
J. MACAFEE.
MILK COOLER.
(Application filed May 10, 1899.)
(No Model.)
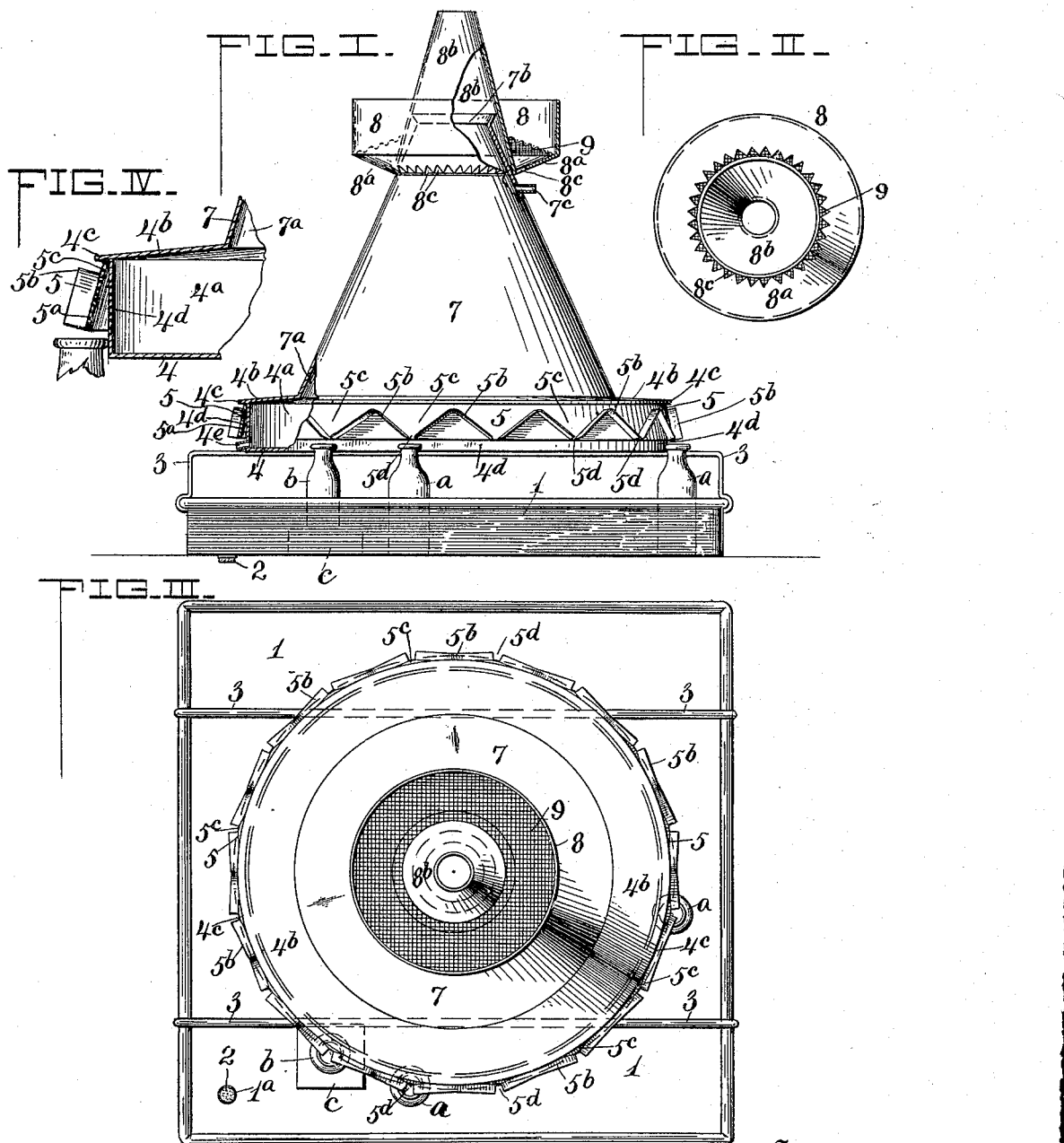
Witnesses
W. E. Allen
Walter Allen
Inventor
Judson Macafee,
by Burton Macafee,
Attorney

UNITED STATES PATENT OFFICE.

JUDSON MACAFEE, OF ATHENS, PENNSYLVANIA.

MILK-COOLER.

SPECIFICATION forming part of Letters Patent No. 638,932, dated December 12, 1899.

Application filed May 10, 1899. Serial No. 716,270. (No model.)

*To all whom it may concern:*

Be it known that I, JUDSON MACAFEE, a citizen of the United States, and a resident of Athens, (Riverside farm,) in the county of Bradford and State of Pennsylvania, have invented certain new and useful Improvements in a Combined Milk Aerator and Cooler, of which the following is a specification.

My invention relates to a milk aerator and cooler in which the milk is strained, aerated, cooled, and discharged into the bottles at one operation, and the bottles are then sealed ready for delivery to the dealers or customers.

The object of my invention is to strain, aerate, cool, and bottle the milk, so as to remove impurities, animal smell and heat, and thoroughly and rapidly chill the milk, thus reducing to a minimum the time in which it is exposed to contamination by the surrounding atmosphere and permitting it to enter the bottles a short time after it is poured into the reservoir.

My improvement consists in novel features of construction, as hereinafter described and claimed.

In order that my invention may be fully understood, I will proceed to describe it with reference to the accompanying drawings, in which—

Figure I is a front elevation of my improved combined milk aerator and cooler, parts being shown in section. Fig. II is a bottom view of the reservoir. Fig. III is a top view of the device. Fig. IV is a detail vertical section of the apron part of the device.

1 is a tray or tank in which are placed the vessels, such as bottles $a\ b$, to be filled. The smaller bottles $b$ may be elevated by means of a block $c$, on which they are seated. The tray is provided for the purpose of receiving any overflow of milk in filling the bottles and has an outlet-opening $1^a$ in the bottom closed by a cork plug 2. Extending across the tray and secured to opposite sides thereof is a bridge, consisting of a pair of bars or rods 3, on which my improved combined aerator and cooler is supported, so that it can be readily removed when desired for the purpose of cleaning the device.

4 is a cylindrical base providing a lower chamber $4^a$ and a step $4^b$, having a surface slightly inclined downwardly toward its edge, where it merges into a peripheral ledge $4^c$, which overhangs the wall or shell $4^d$ of the base.

$4^e$ is a pipe extending through the wall $4^d$ of the base. Surrounding the wall $4^d$ and supported at the edge of the step $4^b$ beneath the ledge $4^c$ is an apron or skirt 5, whose lower edge is out of contact with the wall $4^d$, so as to leave an angular circumferential air-space $5^a$ between the wall and the apron.

$5^b$ are inverted-V-shaped guide-plates or deflectors arranged in zigzag fashion around the apron, secured thereto, separated at their lower ends, and providing downwardly-converging or V-shaped chutes $5^c$, having outlets $5^d$ between each guide-plate beneath which the bottles to be filled are placed.

Located in a central position on the base is the body 7 of the device, of frusto-conical shape, open at the top and providing an upper chamber $7^a$ and formed at its upper end with a funnel-shaped top $7^b$.

$7^c$ is a pipe extending through the upper part of the wall of the body.

8 is a reservoir surrounding the upper end of the body. This reservoir is constructed with a bottom $8^a$, of inverted-frusto-conical shape, and with a central air-tube $8^b$, of frusto-conical shape, extending a considerable distance above the reservoir, whereby the reservoir is supported on the body, so as to fit around the funnel-shaped top of the body. Adjacent to the central air-tube the bottom is formed with an annular series of openings $8^c$, of triangular shape, the base of the openings lying against the central air-tube and their apexes projecting radially toward the wall of the reservoir. The reservoir is also provided with a strainer 9, of frusto-conical shape, surrounding the central air-tube and extending to the wall of the reservoir. The base-chamber and the body-chamber are adapted to contain ice or other cooling compound, with which they are filled through the funnel-shaped top, access to the top being gained thereto by merely lifting off the reservoir. Ice-water can be drawn off through the pipe $4^e$ in the base. If the supply of water is sufficiently cold for cooling purposes, ice can be dispensed with and the service-pipe connected with either the pipe $4^e$ in the base or with the pipe $7^c$ in the body, the water passing through the chambers and out of the other pipe, though I prefer to connect the service-pipe with the pipe in the base, so that the water may pass upward and out of the pipe in the body. The space 5ª between the wall of the base and the apron 5 provides a cold-air chamber. The part of the wall 4ᵈ of the base below the apron provides a stop, against which the necks of the bottles come in contact for positioning the bottles with their mouths in line with the outlets of the chutes of the apron.

The operation of the device will be apparent. The chambers within the base and body having been filled with ice or other cooling compound or cold water having been permitted to pass through the chambers, the base and body of the device will be thoroughly chilled, while the air within the chambers will pass out of the funnel-shaped top of the body. The reservoir is next placed in position, with its central air-tube seating on the body and fitting around the funnel-shaped top. This central air-tube is entirely open, and its height causes the air above the cooling medium to rapidly pass out as it is warmed by the milk streaming onto the upper part of the body. A continuous supply of fresh milk is poured into the reservoir and passes through the strainer over the inwardly-inclined bottom of the reservoir, from whence the milk is deflected toward the triangular openings, from which it streams through the air onto the upper part of the body and thence flows in a continuous sheet down the surface of the body and over the surface of the step of the base and over the ledge, from which it falls through the air onto the guide-plates and is gathered by the converging chutes and passes through the outlets from the chutes in continuous streams into the bottles.

Having thus described my invention, the following is what I claim as new therein and desire to secure by Letters Patent:

1. A combined milk aerator and cooler comprising a base having a step providing a surface over which the liquid is spread, an apron, located at the edge of the step, having chutes through which the liquid is discharged, and a body, located over the base, down which the liquid flows onto the step of the base, substantially as described.

2. A combined milk aerator and cooler comprising a base having a step and a ledge projecting from the step and overhanging the base, an apron, located beneath the ledge, having chutes, and a body located over the base; substantially as described.

3. A combined milk aerator and cooler comprising a base having a step, an apron, located at the edge of the step, having zigzag guide-plates separated at their lower ends and providing downwardly-converging chutes, and a body located over the base; substantially as described.

4. A combined milk aerator and cooler comprising a base having a step, an apron, located at the edge of the step, having chutes, and having its lower edge forming, in connection with the wall of the base, a stop for positioning the bottles to be filled beneath the outlets of the chutes; substantially as described.

5. A combined milk aerator and cooler comprising a base having a step provided with a slightly, outwardly-inclined surface, and an apron, located at the edge of the step, having chutes; substantially as described.

6. A combined milk aerator and cooler comprising a base having a step providing a surface over which the liquid is spread, an apron, located at the edge of the step, having chutes through which the liquid is discharged, a tank, in which the bottles to be filled are placed, and a bridge for supporting the device over the tank; substantially as described.

7. A combined milk aerator and cooler comprising a body of frusto-conical shape, having a funnel-shaped upper end, and a reservoir constructed with a bottom of inverted-frusto-conical shape, having an annular series of openings, with a central air-tube of frusto-conical shape, and with a strainer of frusto-conical shape surrounding the central air-tube and extending to the wall of the reservoir; substantially as described.

JUDSON MACAFEE.

Witnesses:
FRANK E. LUCKEY,
GEO. W. FERGUSON.